US012283231B2

(12) United States Patent
Chen et al.

(10) Patent No.: US 12,283,231 B2
(45) Date of Patent: Apr. 22, 2025

(54) ELECTRONIC DEVICE

(71) Applicant: InnoLux Corporation, Miao-Li County (TW)

(72) Inventors: Chung-Le Chen, Miao-Li County (TW); Shuo-Ting Hong, Miao-Li County (TW); Ting-Yao Chu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/500,346

(22) Filed: Nov. 2, 2023

(65) Prior Publication Data

US 2024/0185771 A1 Jun. 6, 2024

(30) Foreign Application Priority Data

Dec. 2, 2022 (CN) ......................... 202211541263.4

(51) Int. Cl.
*G09G 3/32* (2016.01)
*G09G 3/3233* (2016.01)

(52) U.S. Cl.
CPC ....... *G09G 3/32* (2013.01); *G09G 2300/0842* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 8,493,295 | B2 | 7/2013 | Yamazaki et al. | |
| 11,361,713 | B1 * | 6/2022 | Fu | G09G 3/3241 |
| 2005/0200618 | A1 * | 9/2005 | Kim | G09G 3/3233 345/204 |
| 2011/0050736 | A1 * | 3/2011 | Fan | G09G 3/3233 345/82 |
| 2011/0089845 | A1 * | 4/2011 | Keh | G09G 3/3406 315/297 |
| 2011/0128211 | A1 * | 6/2011 | Ono | H01L 27/1255 345/76 |
| 2012/0127221 | A1 * | 5/2012 | Tamaki | G09G 3/3233 345/691 |
| 2012/0162176 | A1 * | 6/2012 | Kim | G09G 3/3258 345/211 |
| 2016/0099262 | A1 * | 4/2016 | Lin | H01L 27/124 257/43 |
| 2017/0123539 | A1 * | 5/2017 | Wang | G09G 3/2096 |
| 2018/0068611 | A1 * | 3/2018 | Chaji | G09G 3/325 |
| 2018/0122298 | A1 * | 5/2018 | Lee | H01L 27/124 |
| 2018/0357961 | A1 * | 12/2018 | Yang | G09G 3/3258 |
| 2019/0191504 | A1 * | 6/2019 | Mao | G09G 3/32 |

(Continued)

*Primary Examiner* — Sepehr Azari
(74) *Attorney, Agent, or Firm* — McClure, Qualey & Rodack, LLP

(57) ABSTRACT

An electronic device includes a pixel circuit. The pixel circuit includes a driving transistor, an emission transistor, a capacitor, and a light-emitting element. The driving transistor is electrically connected to the emission transistor and the capacitor. The emission transistor is electrically connected to the light-emitting element. Under the same driving voltage, the driving transistor has a first conductive resistance value, the emission transistor has a second conductive resistance value, and the first conductive resistance value is greater than the second conductive resistance value.

19 Claims, 3 Drawing Sheets

100

(56) References Cited

U.S. PATENT DOCUMENTS

| | | | | |
|---|---|---|---|---|
| 2019/0214447 A1* | 7/2019 | Kim | | H10K 59/126 |
| 2020/0202771 A1* | 6/2020 | Takasugi | | H01L 27/156 |
| 2021/0142728 A1* | 5/2021 | Jiang | | G09G 3/3291 |
| 2022/0051625 A1* | 2/2022 | Lai | | G09G 3/3233 |
| 2023/0091644 A1* | 3/2023 | Charisoulis | | G09G 3/2074 |
| | | | | 345/694 |

* cited by examiner

ELECTRONIC DEVICE

CROSS REFERENCE TO RELATED APPLICATIONS

This application claims priority of China Patent Application No. 202211541263.4, filed on Dec. 2, 2022, the entirety of which is incorporated by reference herein.

BACKGROUND OF THE DISCLOSURE

Field of the Disclosure

The disclosure relates to an electronic device, and in particular, to an electronic device capable of optimizing a pixel circuit.

Description of the Related Art

The electronic device includes elements (such as a light-emitting element, a transistor, and a capacitor) wherein the current flowing through the light-emitting element is related to the size of the transistor and the magnitude of the capacitor. However, if the parameters of the above elements are not well designed, this may affect the quality and power of the electronic device. Therefore, a design that optimizes the electronic device is required to improve the quality and power of the electronic device.

BRIEF SUMMARY OF THE DISCLOSURE

An embodiment of the disclosure provides an electronic device, which includes a pixel circuit. The pixel circuit includes a driving transistor, an emission transistor, a capacitor, and a light-emitting element. The driving transistor is electrically connected to the emission transistor and the capacitor. The emission transistor is electrically connected to the light-emitting element. Under the same driving voltage, the driving transistor has a first conductive resistance value, the emission transistor has a second conductive resistance value, and the first conductive resistance value is greater than the second conductive resistance value.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
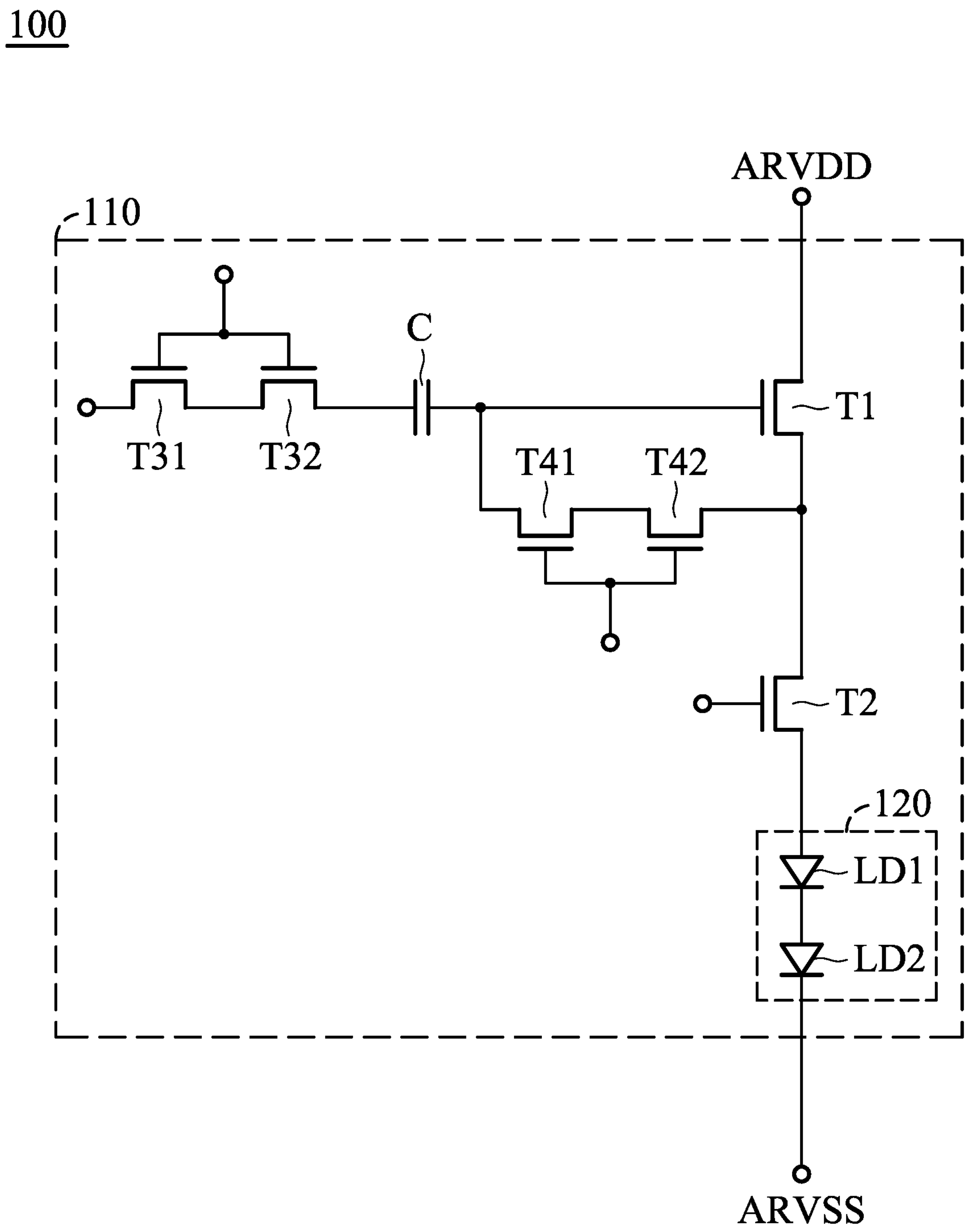
FIG. 1 is a schematic view of an electronic device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term "coupled" or "electrically connected" may include any direct and indirect means of electrical connection.

In the text, the terms "substantially" or "approximately" usually means within 20%, or within 10%, or within 5%, or within 3%, or within 2%, or within 1%, or within 0.5% of a given value or range. The quantity given here is an approximate quantity. That is, without the specific description of "substantially" or "approximately", the meaning of "substantially" or "approximately" may still be implied.

The "including" mentioned in the entire specification and claims is an open term, so it should be interpreted as "including or comprising but not limited to".

Furthermore, "connected or "coupled" herein includes any direct and indirect connection means. Therefore, an element or layer is referred to as being "connected to" or "coupled to" another element or layer, the element or layer can be directly on, connected or coupled to another element or layer or intervening elements or layers may be present. When an element is referred to as being "directly connected to" or "directly coupled to" another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode or a photodiode. The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of an electronic device according to an embodiment of the disclosure. Please refer to FIG. 1. The electronic device 100 may include a pixel circuit 110. The pixel circuit 110 may at least include a driving transistor T1, an emission transistor T2, a capacitor C and a light-emitting element 120. In the embodiment, the pixel circuit 110 may be a circuit structure formed by a plurality of transistors. For example, in some embodiments, the pixel circuit 110 may be the circuit structure formed by two transistors and one capacitor (2T1C). In some embodiments, the pixel circuit 110 may be the circuit structure formed by six transistors and one capacitor (6T1C). In some embodiments, the pixel circuit 110 may be the circuit structure formed by seven transistors and two capacitors (7T2C). In some embodiments, the pixel circuit 110 may be the circuit structure formed by eight transistors and two capacitors (8T2C), but the disclosure is not limited thereto. The following embodiment will be illustrated with the circuit structure formed by six transistors and one capacitor, but the disclosure is not limited thereto.

In the embodiment, the driving transistor T1 may be a thin film transistor (TFT), but the disclosure is not limited thereto. In addition, the driving transistor T1 may be an N-type transistor, and the driving transistor T1 may have a first terminal, a second terminal and a control terminal, wherein the first terminal of the driving transistor T1 is, for example, a drain terminal of the transistor, the second terminal of the driving transistor T1 is, for example, a source terminal of the transistor, and the control terminal of the driving transistor T1 is, for example, a gate terminal of the transistor, but the disclosure is not limited thereto. In other embodiments, the driving transistor T1 may also be a P-type transistor or another suitable transistor.

The emission transistor T2 may be a thin film transistor, but the disclosure is not limited thereto. In addition, the emission transistor T2 may be an N-type transistor, and the emission transistor T2 may have a first terminal, a second terminal and a control terminal, wherein the first terminal of the emission transistor T2 is, for example, a drain terminal of the transistor, the second terminal of the emission transistor T2 is, for example, a source terminal of the transistor, and the control terminal of the emission transistor T2 is, for example, a gate of the transistor, but the disclosure is not limited thereto. In other embodiment, the emission transistor T2 may also be a P-type transistor or another suitable transistor.

In the embodiment, the capacitor C may be a storage capacitor, but the disclosure is not limited thereto. The capacitor C may have a first terminal and a second terminal.

In the embodiment, the light-emitting element 120 may include a light-emitting diode LD1 and light-emitting diode LD2. In addition, each of the light-emitting diode LD1 and the light-emitting diode LD2 may be an organic light-emitting diode or an inorganic light-emitting diode, wherein the inorganic light-emitting diode may include, for example, a mini LED, a micro LED, a quantum dot LED, or a combination thereof. Furthermore, each of the light-emitting diode LD1 and the light diode LD2 may have a first terminal and a second terminal, wherein the first terminals of the light-emitting diode LD1 and the light-emitting diode LD2 may be anode terminals, and the second terminals of the light-emitting diode LD1 and the light-emitting diode LD2 may be cathode nodes, but the disclosure is not limited thereto.

The first terminal (such the anode terminal) of the light-emitting diode LD2 may be electrically connected to the second (such as the cathode node) of the light-emitting diode LD1. That is, the light-emitting diode LD1 and the light-emitting diode LD2 are connected in series. In addition, the first terminal (such the anode terminal) of the light-emitting diode LD1 may be served as the first terminal of the light-emitting element 120, and the second terminal (such as the cathode terminal) of the light-emitting diode LD2 may be served as the second terminal of the light-emitting element 120. Furthermore, the number of light-emitting diodes included in the light-emitting element 120 is two (i.e., the light-emitting diode LD1 and a light-emitting diode LD2), but the disclosure is not limited thereto. The number of the light-emitting diodes included in the light-emitting element 120 may be at least one. When the light-emitting element 120 includes one light-emitting diode, the light-emitting element 120 is electrically connected to other elements through the first terminal and the second terminal of the light-emitting diode. When the number of light-emitting diodes is more than two, the more than two light-emitting diodes may also be electrically connected to other elements in series. In some embodiments, the light-emitting diodes may also be electrically connected to other elements in parallel, but the disclosure is not limited thereto.

In the embodiment, the driving transistor T1 may be electrically connected to the emission transistor T2 and the capacitor C. Furthermore, the second terminal (such as the source terminal) of the driving transistor T1 may be electrically connected to the first terminal (such as the drain terminal) of the emission transistor T2, and the control terminal (such as the gate terminal) of the driving transistor T1 may be electrically connected to the first terminal of the capacitor C. In addition, the driving transistor T1 may also be electrically connected to a reference voltage ARVDD, wherein the reference voltage ARVDD may be, for example, a system voltage, but the disclosure is not limited thereto. Furthermore, the first terminal (such as the drain terminal) of the driving transistor T1 may be electrically connected to the reference voltage ARVDD.

The emission transistor T2 may be electrically connected to the light-emitting element 120. Furthermore, the second terminal (such as the drain terminal) of the emission transistor T2 may be electrically connected to the first terminal of the light-emitting element 120 (such as the first terminal (such as the cathode terminal) of the light-emitting diode LD1). In addition, the control terminal (such as the gate terminal) of the emission transistor T2 may receive an emission control signal. Furthermore, the light-emitting element 120 may also be electrically connected to a reference voltage ARVSS, wherein the reference voltage ARVSS is, for example, a ground voltage, but the disclosure is not limited thereto. Furthermore, the second terminal of the light-emitting element 120 (such as the second terminal (such as the cathode terminal) of the light-emitting diode LD2) may be electrically connected to the reference voltage ARVSS. In some embodiments, the reference voltage ARVDD may be a high voltage, and the reference voltage ARVSS may be a low voltage, but the disclosure is not limited thereto.

In the embodiment, under the same driving voltage, the driving transistor T1 may have a first conductive resistance value Ron1, the emission transistor T2 may have a second conductive resistance value Ron2, and the first conductive resistance value Ron1 of the driving transistor T1 may be greater than the second conductive resistance value Ron2 of the emission transistor T2.

In some embodiments, the first conductive resistance value Ron1 of the driving transistor T1 may be expressed by formula (1):

$$Ron1=0.0023*I\_led^6-0.1338*I\_led^5+3.1886*I\_led^4-39.162*I\_led^3+263.54*I\_led^2-952.84*I\_led+1678.5 \quad (1)$$

wherein Ron1 is the first conductive resistance value of the driving transistor T1, and I_led is the value of the current flowing through the light-emitting element 120. In addition, the corresponding relationship between the first conductive resistance value Ron1 of the driving transistor T1 and the value of the current I_led flowing through the light-emitting element 120 is illustrated in FIG. 2.

Figure 2:
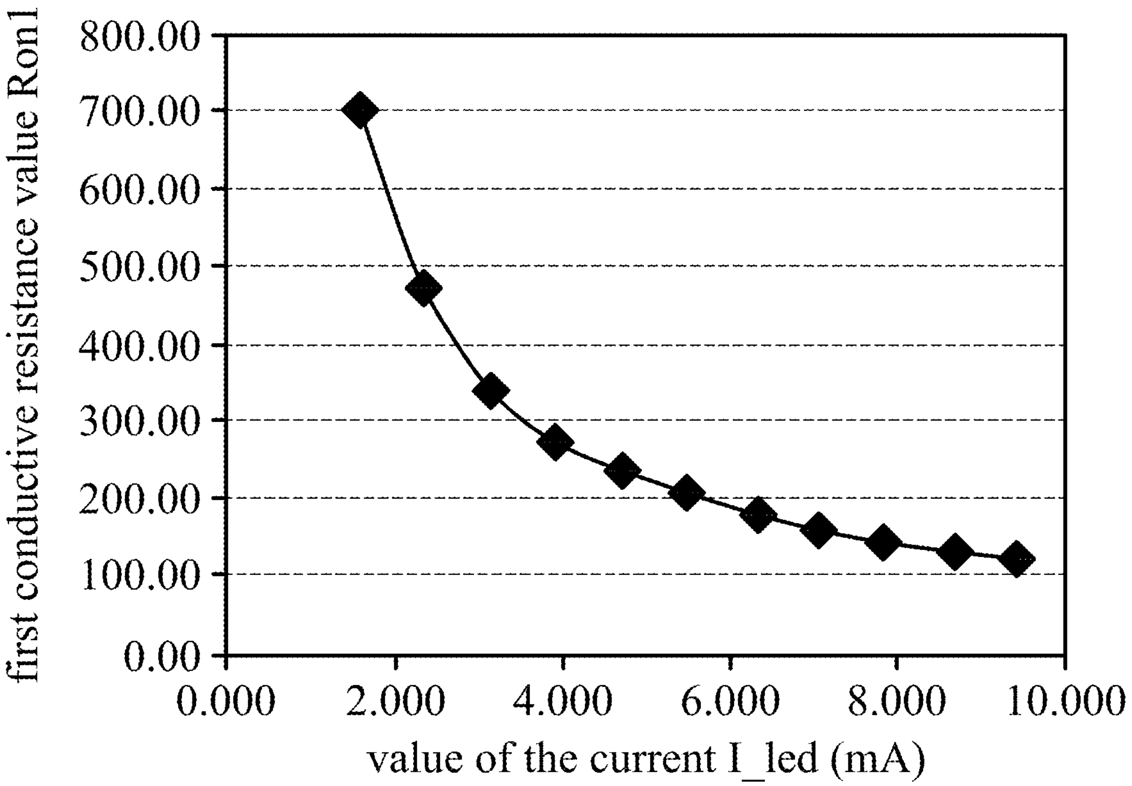
FIG. 2 is a schematic view of a corresponding relationship between a first conductive resistance value of a driving transistor and a value of a current flowing through a light-emitting element according to an embodiment of the disclosure.

In FIG. 2, it can be seen that when the value of the current I_led is 1.55 milliampere (mA), the first conductive resistance value Ron1 is about 706.97. When the value of the current I_led is 2.35 mA, the first conductive resistance value Ron1 is about 471.27. When the value of the current I_led is 3.12 mA, the first conductive resistance value Ron1 is about 345.07. When the value of the current I_led is 3.9 mA, the first conductive resistance value Ron1 is about 274.75. When the value of the current I_led is 4.71 mA, the first conductive resistance value Ron1 is about 233.75. When the value of the current I_led is 5.49 mA, the first conductive resistance value Ron1 is about 204.83. When the value of the current I_led is 6.29 mA the first conductive resistance value Ron1 is about 174.61, but the disclosure is not limited thereto.

In addition, the width/length ratio of the channel area of the driving transistor T1 may be expressed by formula (2):

$$Ron1=0.925V/(0.876\ uA*W1/L1) \quad (2)$$

wherein W1/L1 is the width/length ratio of the channel area of the driving transistor T1. That is, after obtaining the first conductive resistance value Ron1 of the driving transistor T1 through the formula (1), the first conductive resistance value Ron1 of the driving transistor may be substituted into the formula (2), so as to obtain the width/length ratio W1/L1 of the channel area of the driving transistor T1.

For example, when the first conductive resistance value Ron1 is about 706.97, the width/length ratio W1/L1 is about 1494. When the first conductive resistance value Ron1 is about 471.27, the width/length ratio W1/L1 is about 2241. When the first conductive resistance value Ron1 is about 345.07, the width/length ratio W1/L1 is about 3061. When the first conductive resistance value Ron1 is about 274.75, the width/length ratio W1/L1 is about 3844. When the first conductive resistance value Ron1 is about 233.75, the width/length ratio W1/L1 is about 4519. When the first conductive resistance value Ron1 is about 204.83, the width/length ratio W1/L1 is about 5157. When the first conductive resistance value Ron1 is about 174.61, the width/length ratio W1/L1 is about 6049, but the disclosure is not limited thereto. As mentioned above, with the increase of the value of the current I_led, the first conductive resistance value Ron1 presents a decreasing trend, and the width/length ratio W1/L1 presents an increasing trend. In addition, the trend of the above value of the current I_led and the first conductive resistance value Ron1 corresponds to FIG. 2. As mentioned above, through the setting of the value of the current I_led, the conductive resistance value and the related size (such as the width/length ratio of the channel area, etc.) corresponding the driving transistor T1 may be optimized.

In some embodiments, the second conductive resistance value Ron2 of the emission transistor T2 may be expressed by formula (3):

$$Ron2=9E-05*I\_led^6-0.0055*I\_led^5+0.1322*I\_led^4-1.6519*I\_led^3+11.561*I\_led^2-45.073*I\_led+89.865 \quad (3)$$

wherein Ron2 is the second conductive resistance value of the emission transistor T2, and I_led is the value of the current flowing through the light-emitting element 120. In addition, the corresponding relationship between the second conductive resistance value Ron2 of the emission transistor T2 the value of the current I_led flowing through the light-emitting element 120 is illustrated in FIG. 3.

Figure 3:
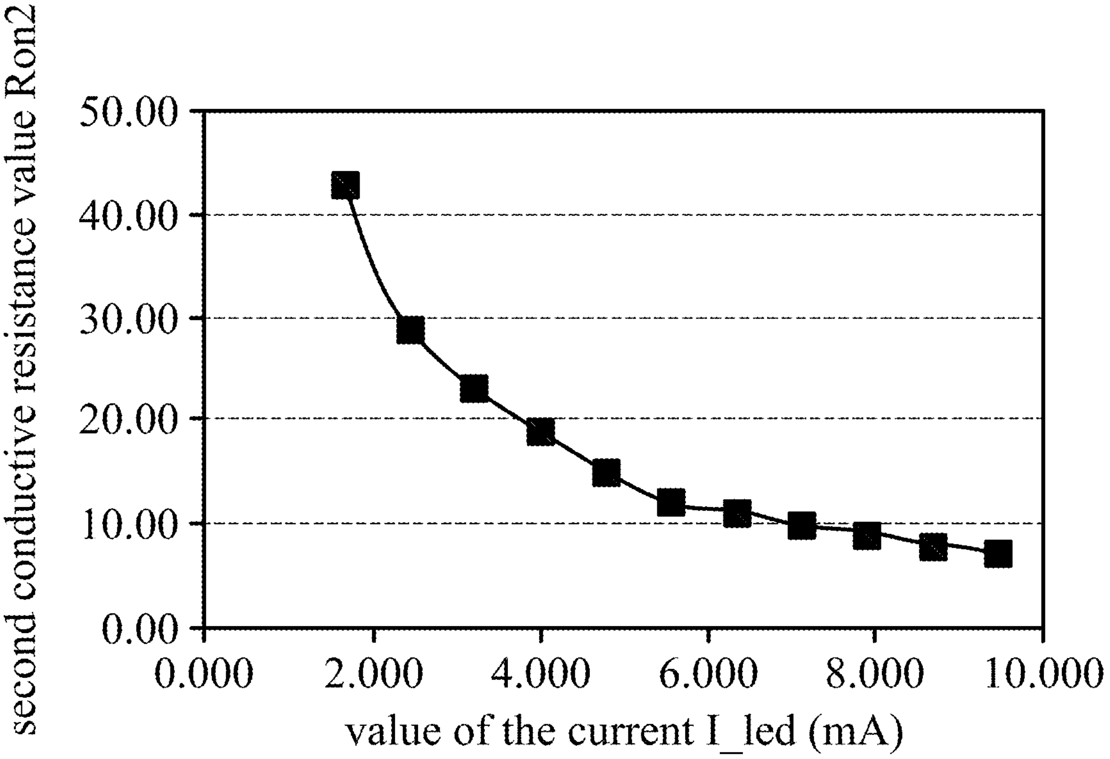
FIG. 3 is a schematic view of a corresponding relationship between a second conductive resistance value of an emission transistor and a value of a current flowing through a light-emitting element according to an embodiment of the disclosure.

In FIG. 3, it can be seen that when the value of the current I_led is 1.55 mA, the second conductive resistance value Ron2 is about 42.79. When the value of the current I_led is 2.35 mA, the second conductive resistance value Ron2 is about 28.53. When the value of the current I_led is 3.12 mA, the second conductive resistance value Ron2 is about 23.28. When the value of the current I_led is 3.9 mA, the second conductive resistance value Ron2 is about 18.96. When the value of the current I_led is 4.71 mA, the second conductive resistance value Ron2 is about 14.66. When the value of the current I_led is 5.49 mA, the second conductive resistance value Ron2 is about 11.68. When the value of the current I_led is 6.29 mA, the second conductive resistance value Ron2 is about 11.15, but the disclosure is not limited thereto.

Comparing the above formula (1) of the first conductive resistance value Ron1 and the above formula (3) of the second conductive resistance value Ron2 or comparing FIG. 2 and FIG. 3, it can be seen that under the same driving voltage, the first conductive resistance value Ron1 is greater than the second conductive resistance value Ron2. As mentioned above, for example, when the value of the current I_led is 1.55 mA, the first conductive resistance value Ron1 of about 706.97 is greater than the second conductive resistance value Ron2 of about 42.79. When the value of the current I_led is 2.35 mA, the first conductive resistance value Ron1 of about 471.27 is greater than the second conductive resistance value Ron2 of about 28.53. When the value of the current I_led is 3.12 mA, the first conductive resistance value Ron1 of about 345.07 is greater than the second conductive resistance value Ron2 of about 23.28. When the value of the current I_led is 3.9 mA, the first conductive resistance value Ron1 of about 274.75 is greater than the second conductive resistance value Ron2 is 18.96. When the value of the current I_led is 4.71 mA, the first conductive resistance value Ron1 of about 233.75 is greater than the second conductive resistance value Ron2 of about 14.66. When the value of the current I_led is 5.49 mA, the first conductive resistance value Ron1 of about 204.83 is greater than the second conductive resistance value Ron2 of about 11.68. When the value of the current I_led is 6.29 mA, the first conductive resistance value Ron1 of about 174.61 is greater than the second conductive resistance value Ron2 of about 11.15, but the disclosure is not limited thereto.

In addition, the width/length ratio of the channel area of the emission transistor T2 may be expressed by formula (4):

$$Ron2=0.125V/(5.92\ uA*W2/L2) \quad (4)$$

wherein W2/L2 is the width/length ratio of the channel area of the emission transistor T2. That is, after obtaining the second conductive resistance value Ron2 of the emission transistor T2 through the formula (3), the second conductive resistance value Ron2 of the emission transistor T2 may be substituted into the formula (4), so as to obtain the width/length ratio W2/L2 of the channel area of the emission transistor T2.

For example, when the second conductive resistance value Ron2 is about 42.79, the width/length ratio W2/L2 is about 493.2. When the second conductive resistance value Ron2 is about 28.53, the width/length ratio W2/L2 is about 739.8. When the second conductive resistance value Ron2 is about 23.28, the width/length ratio W2/L2 is about 906.6. When the second conductive resistance value Ron2 is about 18.96, the width/length ratio W2/L2 is about 1113.2. When the second conductive resistance value Ron2 is about 14.66, the width/length ratio W2/L2 is about 1439.8. When the second conductive resistance value Ron2 is about 11.68, the width/length ratio W2/L2 is about 1806.4. When the second conductive resistance value Ron2 is about 11.15, the width/length ratio W2/L2 is about 1893, but the disclosure is not limited thereto. As mentioned above, with the increase of the value of the current I_led, the second conductive resistance value Ron2 presents a decreasing trend, and the width/length ratio W2/L2 presents an increasing trend. In addition, the trend of the above value of the current I_led and the second conductive resistance value Ron2 corresponds to FIG. 3. As mentioned above, through the setting of the value of the current I_led, the conductive resistance value and the related size (such as the width/length ratio of the channel area, etc.) corresponding the emission transistor T2 may be optimized.

In some embodiments, the capacitance value of the capacitor C may be expressed by formula (5):

$$Cst=1.0784*I\_led^2+24.671*I\_led+2.9833 \quad (5)$$

wherein Cst is the capacitance value of the capacitor C, the unit is picofarad (pF), and I_led is the value of the current flowing through the light-emitting element 120. In addition, the corresponding relationship between the capacitance value Cst of the capacitor C and the value of the current I_led flowing through the light-emitting element 120 is illustrated in FIG. 4.

Figure 4:
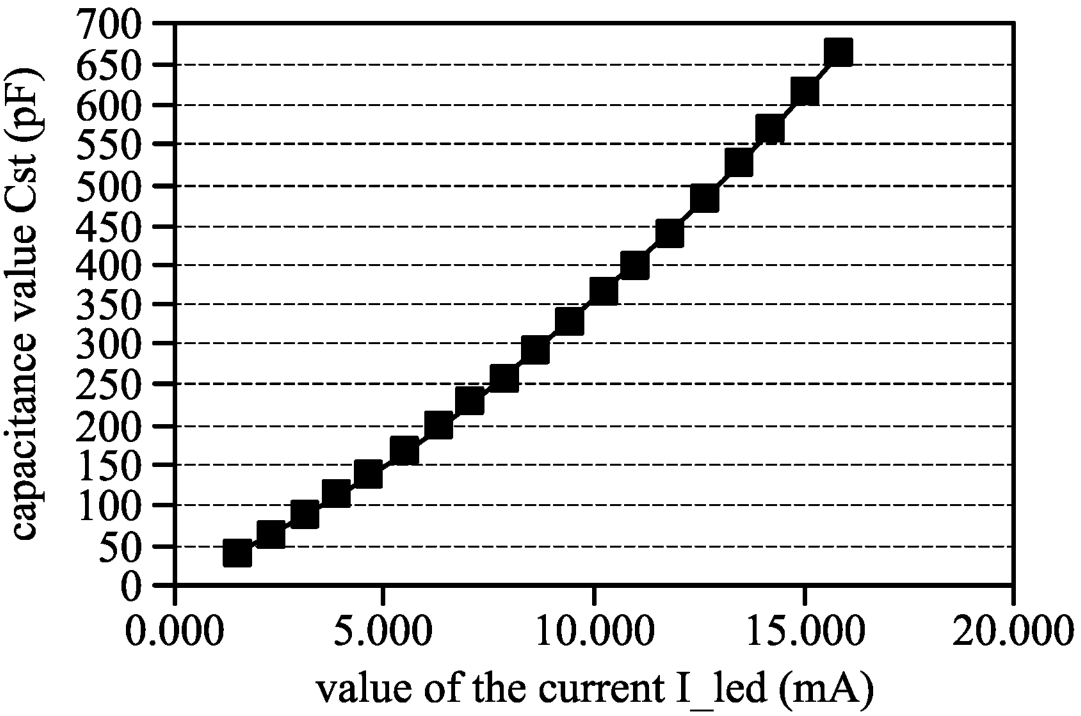
FIG. 4 is a schematic view of a corresponding relationship between a capacitance value of a capacitor and a value of a current flowing through a light-emitting element according to an embodiment of the disclosure.

In FIG. 4, it can be seen that when the value of the current I_led is 1.55 mA, the capacitance value Cst is about 43 pF. When the value of the current I_led is 2.35 mA, the capacitance value Cst is about 66 pF. When the value of the current I_led is 3.12 mA, the capacitance value Cst is about 90 pF. When the value of the current I_led is 3.9 mA, the capacitance value Cst is about 116 pF. When the value of the current I_led is 4.71 mA, the capacitance value Cst is about 144 pF. When the value of the current I_led is 5.49 mA, the capacitance value Cst is about 172 pF. When the value of the current I_led is 6.29 mA, the capacitance value Cst is about 202 pF, but the disclosure is not limited thereto. As mentioned above, with the increase of the value of the current I_led, the capacitance value Cst of the capacitor Cst presents an increasing trend. In addition, the trend of the above value of the current I_led and the capacitance value Cst corresponds to FIG. 4. As mentioned above, through the setting of the value of the current I_led, the magnitude of capacitance value Cst corresponding to the capacitor C may be optimized.

In some embodiments, the sum of the first voltage difference Vds1 of the first terminal (such as the drain terminal) and the second terminal (such as the source terminal) of the driving transistor T1 and the second voltage difference Vds2 between the first terminal (such as the drain terminal) and the second terminal (such as the source terminal) of the emission transistor T2 may be 2.5V, i.e., (Vds1+Vds2) <2.5V. For example, Vds1 may be 0.925 volts (V), and Vds2 may be 0.125V, but the disclosure is not limited thereto. Therefore, excessive heat generation or excessive power consumption by the driving transistor T1 and the emission transistor T2 may be effectively reduced.

In some embodiments, the power efficiency of the light-emitting element 120 may be greater than 70%. Furthermore, the power efficiency of the light-emitting element 120 may be expressed by formula (6):

$$P=V\_led/(V\_led+Vds1+Vds2)\times100\%>70\% \quad (6)$$

wherein P is the power efficiency of the light-emitting element 120, V_led is a voltage difference between the first terminal (such as the first terminal (such as the anode terminal) of the light-emitting diode) and the second terminal (such as the second terminal (such as the cathode terminal) of the light-emitting diode) of the light-emitting element 120, Vds1 is a voltage difference between the first terminal (such as the drain terminal) and the second terminal (such as the source terminal) of the driving transistor T1, and Vds2 is a voltage difference between the first terminal (such as the drain terminal) and the second terminal (such as the source terminal) of the emission transistor T2.

For example, assuming that the reference voltage ARVDD is, 6.5V, the reference voltage ARVSS is 0V, Vds1 is 0.925V, and Vds2 is, 0.125V, then V_led is about 5.4 (i.e., 6.5-0.925-0.125)V, but the disclosure is not limited thereto. Then, Vds1=0.925V, Vds2=0.125 and V_led=5.4V are substituted into the formula (6), so as to obtain P=5.4/(5.4+ Vds1+Vds2)×100%-83.7%>70%. As mentioned above, through the design of the disclosure, the power efficiency of the light-emitting element 120 may be optimized or a suitable value of the current of the light-emitting element 120 may be provided.

In some embodiments, the pixel circuit 110 may further include a switch transistor T31, a switch transistor T32, a switch transistor T41, a switch transistor T42, etc., but the disclosure is not limited thereto.

Each of the switch transistor T31, the switch transistor T32, the switch transistor T41 and the switch transistor T42 may be a thin film transistor, but the disclosure is not limited thereto. In addition, each of the switch transistor T31, the switch transistor T32, the switch transistor T41 and the switch transistor T42 may be an N-type transistor, and each of the switch transistor T31, the switch transistor T32, the switch transistor T41 and the switch transistor T42 may have a first terminal, a second terminal and a control terminal. The first terminal of each of the switch transistor T31, the switch transistor T32, the switch transistor T41 and the switch transistor T42 is, for example, a drain terminal of the transistor, the second terminal of each of the switch transistor T31, the switch transistor T32, the switch transistor T41 and the switch transistor T42 is, for example, a source terminal of the transistor, and the control terminal of each of the switch transistor T31, the switch transistor T32, the switch transistor T41 and the switch transistor T42 is, for example, a gate terminal of the transistor, but the disclosure is not limited thereto. In other embodiments, each of the switch transistor T31, the switch transistor T32, the switch transistor T41 and the switch transistor T42 may also be a P-type transistor or another suitable transistor.

The first terminal (such as the drain terminal) of the switch transistor T31 may receive a data signal. The first terminal (such as the drain terminal) of the switch transistor T32 may be electrically connected to the second terminal (such as the source terminal) of the switch transistor T31. The control terminal (such as the gate terminal) of the switch transistor T32 may be electrically connected to the control terminal (such as the gate terminal) of the switch transistor T31. The control terminal (such as the gate terminal) of the switch transistor T31 and the control terminal (such as the gate terminal) of the switch transistor T32 may receive a scanning signal. The second terminal (such as the source terminal) of the switch transistor T32 may be electrically connected to the second terminal of the capacitor C.

The first terminal (such as the drain terminal) of the switch transistor T41 may be electrically connected to the first terminal of the capacitor C. The first terminal (such as the drain terminal) of the switch transistor T42 may be electrically connected to the second terminal (such as the source terminal) of the switch transistor T41. The control terminal (such as the gate terminal) of the switch transistor T42 may be electrically connected to the control terminal (such as the gate terminal) of the switch transistor T41. The control terminal (such as the gate terminal) of the switch transistor T41 and the control terminal (such as the gate terminal) of the switch transistor T42 may receive a scanning signal. The second terminal (such as the source terminal) of the switch transistor T42 may be electrically connected to the second terminal (such as the source terminal) of the driving transistor T1 and the first terminal (such as the drain terminal) of the emission transistor T2.

In some embodiments, the transistor of the disclosure may include a semiconductor material, and the semiconductor material includes, for example, an amorphous silicon, a low temperature poly-silicon (LTPS), a metal oxide, or a combination of the above materials, but the disclosure is not limited thereto. The structure of the transistor may include a top gate, a bottom gate, or a dual gate or a double gate, or a combination of the above structures, but the disclosure is not limited thereto. In some embodiments, different transistors may include the same semiconductor material or different semiconductor materials, but the disclosure is not limited thereto.

In summary, according to the electronic device disclosed by the embodiments of the disclosure, under the same driving voltage, the driving transistor may have the first conductive resistance value, the emission transistor may have the second conductive resistance value, and the first conductive resistance value is greater than the second conductive resistance value. In addition, through the setting of the current of the light-emitting element, the conductive resistance value and the size related to the transistor corresponding to the driving transistor and the emission transistor and the magnitude of the capacitor may be optimized. Therefore, the power efficiency of the light-emitting element may be optimized, or the suitable value of the current of the light-emitting element may be provided, or excessive heat generation or excessive power consumption by the driving transistor and the emission transistor may be reduced.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. An electronic device, comprising:

a pixel circuit, comprising a driving transistor, an emission transistor, a capacitor and a light-emitting element;

wherein the driving transistor is electrically connected to the emission transistor and the capacitor; and the emission transistor is electrically connected to the light-emitting element;

wherein under the same driving voltage, the driving transistor has a first conductive resistance value, the emission transistor has a second conductive resistance value, and the first conductive resistance value is greater than the second conductive resistance value;

wherein the first conductive resistance value is calculated according to a current flowing through the light-emitting element and the first conductive resistance value is expressed by a following formula:

$$Ron1=0.0023*I\_led^6-0.1338*I\_led^5+3.1886*I\_led^4-39.162*I\_led^3+263.54*I\_led^2-952.84*I\_led+1678.5$$

wherein Ron1 is the first conductive resistance value, I_led is a value of the current flowing through the light-emitting element, and I_led is less than or equal to 10 milliampere (mA).

2. The electronic device according to claim 1, wherein a width/length ratio of the driving transistor is expressed by a following formula:

$$Ron1=0.925V/(0.876\ uA*W1/L1),$$

wherein Ron1 is the first conductive resistance value, and W1/L1 is the width/length ratio of a channel area of the driving transistor.

3. The electronic device according to claim 1, wherein the second conductive resistance value is expressed by a following formula:

$$Ron2=9E-05*I\_led^6-0.0055*I\_led^5+0.1322*I\_led^4-1.6519*I\_led^3+11.561*I\_led^2-45.073*I\_led+89.865,$$

wherein Ron2 is the second conductive resistance value, and I_led is the value of the current flowing through the light-emitting element.

4. The electronic device according to claim 1, wherein a width/length ratio of the emission transistor is expressed by a following formula:

$$Ron2=0.125V/(5.92\ uA*W2/L2),$$

wherein Ron2 is the second conductive resistance value, and W2/L2 is the width/length ratio of a channel area of the emission transistor.

5. The electronic device according to claim 1, wherein a capacitance value of the capacitor is expressed by a following formula:

$$Cst=1.0784*I\_led^2+24.671*I\_led+2.9833,$$

wherein Cst is the capacitance value of the capacitor, and I_led is the value of the current flowing through the light-emitting element.

6. The electronic device according to claim 1, wherein a sum of a first voltage difference between a first terminal and a second terminal of the driving transistor and a second voltage difference between a first terminal and a second terminal of the emission transistor is less than 2.5V.

7. The electronic device according to claim 1, wherein a power efficiency of the light-emitting element is greater than 70%.

8. The electronic device according to claim 7, wherein the power efficiency of the light-emitting element is expressed by a following formula:

$$P=V\_\text{led}/(V\_\text{led}+Vds1+Vds2)\times 100\%>70\% \quad (6)$$

wherein P is the power efficiency of the light-emitting element, V_led is a voltage difference between a first terminal and a second terminal of the light-emitting element, Vds1 is a voltage difference between a first terminal and a second terminal of the driving transistor, and Vds2 is a voltage difference between a first terminal and a second terminal of the emission transistor.

9. The electronic device according to claim 1, wherein the driving transistor is electrically connected to a first reference voltage, and the light-emitting element is electrically connected to a second reference voltage.

10. The electronic device according to claim 9, wherein the first reference voltage is a system voltage.

11. The electronic device according to claim 9, wherein the second reference voltage is a ground voltage.

12. The electronic device according to claim 1, wherein the emission transistor is configured to receive an emission control signal.

13. The electronic device according to claim 1, wherein the light-emitting element comprises at least one light-emitting diode.

14. The electronic device according to claim 1, wherein the light-emitting element comprises a first light-emitting diode and a second light-emitting diode, and the first light-emitting diode and the second light-emitting diode are connected in series.

15. The electronic device according to claim 1, wherein when the value of the current flowing through the light-emitting element increases, the first conductive resistance value decreases, and a width/length ratio of the driving transistor increases.

16. The electronic device according to claim 1, wherein when the value of the current flowing through the light-emitting element increases, the second conductive resistance value decreases, and a width/length ratio of the emission transistor increases.

17. The electronic device according to claim 1, wherein when the value of the current flowing through the light-emitting element increases, a capacitance value of the capacitor increases.

18. The electronic device according to claim 1, wherein the pixel circuit further comprises a first switch transistor and a second switch transistor, the first switch transistor is electrically connected to the second switch transistor, and the second switch transistor is electrically connected to the capacitor.

19. The electronic device according to claim 1, wherein the pixel circuit further comprises a third switch transistor and a fourth switch transistor, the third transistor is electrically connected to the capacitor and the fourth switch transistor, and the fourth switch transistor is electrically connected to the driving transistor and the emission transistor.

* * * * *